(12) United States Patent
Bragg

(10) Patent No.: US 6,877,690 B1
(45) Date of Patent: Apr. 12, 2005

(54) COMBINATION POWERED PARACHUTE AND MOTORCYCLE

(76) Inventor: Albert J. Bragg, 7052 Sundance Dr., Warrenton, VA (US) 20187

( * ) Notice: Subject to any disclaimer, the term of this patent is extended or adjusted under 35 U.S.C. 154(b) by 0 days.

(21) Appl. No.: 10/455,389

(22) Filed: Jun. 6, 2003

Related U.S. Application Data

(60) Provisional application No. 60/391,231, filed on Jun. 26, 2002.

(51) Int. Cl.$^7$ ................................................ B64D 5/00
(52) U.S. Cl. .......................................... 244/2; 244/219
(58) Field of Search ..................................... 244/2, 219

(56) References Cited

U.S. PATENT DOCUMENTS

| | | | |
|---|---|---|---|
| 1,762,657 A | * | 6/1930 | Francesconi et al. ......... 244/49 |
| 4,068,810 A | | 1/1978 | Malewicki |
| 4,657,207 A | * | 4/1987 | Poling ........................ 244/21 |
| 4,749,149 A | | 6/1988 | Gruich |
| 4,865,275 A | * | 9/1989 | Thompson .................. 244/219 |
| 4,913,375 A | * | 4/1990 | Fitzpatrick .................... 244/2 |
| 4,930,724 A | | 6/1990 | Snyder |
| 4,934,630 A | | 6/1990 | Snyder |
| 5,078,335 A | | 1/1992 | David |
| 5,160,100 A | | 11/1992 | Snyder |
| 5,593,111 A | | 1/1997 | Jackson et al. |
| 5,901,924 A | | 5/1999 | Strieber |

FOREIGN PATENT DOCUMENTS

| | | |
|---|---|---|
| DE | 3430412 | 2/1986 |
| EP | 278784 | 8/1988 |
| JP | 03-167099 | 7/1991 |

* cited by examiner

*Primary Examiner*—Michael J. Carone
*Assistant Examiner*—Rick Palabrica
(74) *Attorney, Agent, or Firm*—Richard C. Litman

(57) ABSTRACT

A combination powered parachute and motorcycle modifies an initially conventional motorcycle with the addition of various flight components to provide sustained flight for the machine. A peripheral and overhead safety structure is installed upon the motorcycle, with a second flight engine, propeller, folding propeller guard, and fuel system also installed. The flight engine and all of its systems are completely independent of the conventional motorcycle engine used for surface propulsion. A set of laterally disposed stabilizer wheels is also provided for transition from ground to flight and from flight to ground operation. Lift is provided by a folding parafoil device of either the ram air inflated or partially pneumatically inflated type. For flight operations, the lateral wheels are lowered and extended, the folding propeller guard is extended, and the parafoil is deployed behind the motorcycle, with the parafoil lifting conventionally upon attaining flight speed.

46 Claims, 9 Drawing Sheets

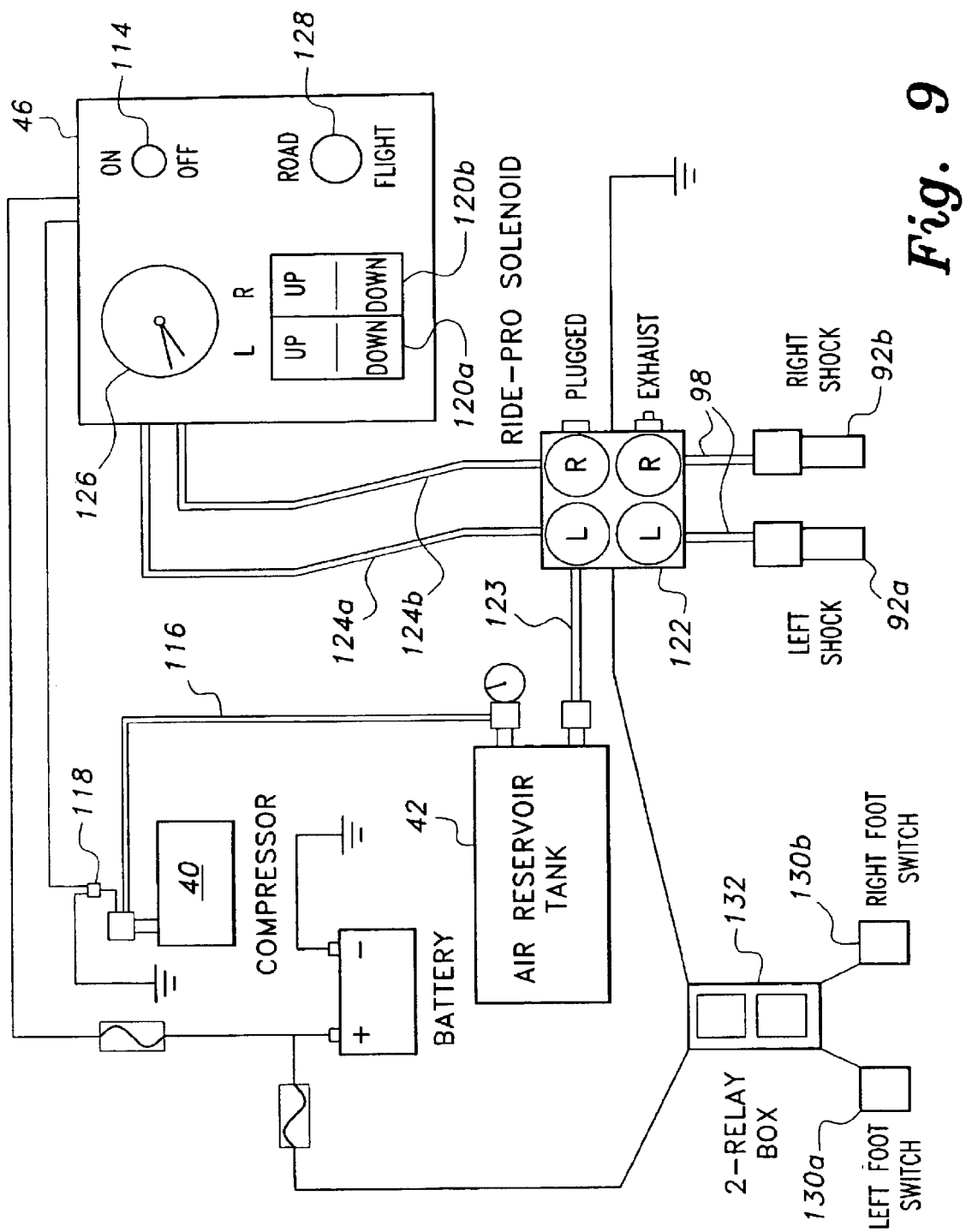

COMBINATION POWERED PARACHUTE AND MOTORCYCLE

CROSS-REFERENCE TO RELATED APPLICATION

This application claims the benefit of U.S. Provisional Patent Application Ser. No. 60/391,231, filed Jun. 26, 2002.

BACKGROUND OF THE INVENTION

1. Field of the Invention

The present invention relates generally to vehicles operable both as ground vehicles and flight vehicles or aircraft, and more particularly to a motorcycle including flightworthy componentry enabling the motorcycle to serve as an aircraft.

2. Description of Related Art

The development of the internal combustion engine, and later turbine engines, has enabled the world to develop practical land vehicles and, shortly thereafter, flying machines of various types. As time progressed, people recognized the benefits which might be obtained by a single vehicle incorporating the ability to fly, as well as function as a practical land vehicle or automobile. Numerous such vehicle designs have been developed in the past, with a number of such flyable ground vehicles, or roadable aircraft, achieving operational status, and even production, in one case.

However, such combination vehicles have their drawbacks in that the lifting surfaces required for flight are bulky and require storage, either on or off the vehicle, for land use of the vehicle. Also, most development of such combination vehicles has centered around a relatively large and heavy structure capable of carrying at least two persons on board, both on the ground and in flight. As a result, some development has occurred with lighter ground vehicles, such as motorcycles and the like. The development of a flyable motorcycle has been advanced by the relatively recent development of flexible wings and parafoils, which depend upon forward motion to generate lift, unlike a conventional parachute. While several patents have been issued for such machines in general, none provide the versatility which is required of such a hybrid vehicle.

Accordingly, a need will be seen for a light weight, motor powered, tandem wheel vehicle (motorcycle) incorporating flight components rendering the machine capable of flight when those flight components are properly deployed and actuated. The present invention provides such a machine, incorporating a conventional motorcycle to which various flight and ancillary components have been installed. The present combination vehicle utilizes a separate flight engine from the powerplant used to power the motorcycle for ground operations, as well as other novel features.

A discussion of the related art of which the present inventor is aware, and its differences and distinctions from the present invention, is presented below.

U.S. Pat. No. 4,068,810 issued on Jan. 17, 1978 to Douglas J. Malewicki, titled "Combination Motorcycle And Hang-Glider," describes a motorcycle which may be converted to an unpowered flight vehicle with the addition of a semi-rigid delta wing, or "Rogallo" wing, so named after its inventor. The Malewicki machine is incapable of powered flight, as the only engine on the machine is the conventional motorcycle engine powering the rear wheel. No other means is used to provide flight propulsion. While Malewicki provides means for adjusting the angle of incidence of the wing structure relative to the motorcycle suspended beneath, this incidence adjustment may be accomplished only once in flight, to allow the leading edge of the wing to move upwardly somewhat. Also, Malewicki uses weight shifting for lateral control, rather than aerodynamic directional control means, as in the present invention. Malewicki also fails to provide any lateral stabilizing wheels for his motorcycle, which stabilizing means is important when the fore and aft wheels of the motorcycle are not turning, as just at landing.

U.S. Pat. No. 4,657,207 issued on Apr. 14, 1987 to Don R. Poling, titled "Kit For Converting A Motorcycle To An Airborne Vehicle," describes a system which utilizes the conventional motorcycle engine and rear drive wheel for applying power to a propeller system, rather than using a separate engine to drive the propeller, as in the present invention. The Poling machine provides a propeller drive roller which bears against one side of the rear drive tire of the motorcycle, with an idler roller on the opposite side to support the lateral load of the frictionally driven propeller drive roller against the motorcycle tire. It is also noted that Poling recognizes the lateral instability of the motorcycle configuration, when the wheels are not turning to provide gyroscopic stability. Accordingly, he provides a pair of laterally disposed landing gear wheels, which extend below the plane defined by the bottoms of the forward and rear motorcycle tires. However, he provides only manual means for raising and lowering these wheels. Poling must manually raise the rear wheel of the motorcycle to lower each of his lateral stabilizing wheels, and then again raise the rear of the motorcycle in order to relieve the weight on the lateral wheels to retract them for road use. In the present invention, the lateral stabilizing wheels are pneumatically actuated by a control from the vehicle operator, with no physical labor being required of the operator. Moreover, the lateral wheels of the present invention may be extended laterally for takeoff and landing use, and retracted for road use as desired. The control system of the Poling machine also differs considerably from that of the present invention, in that Poling connects the lateral control lines to his parafoil to the handlebars. The present inventor feels that it is best to provide separate controls for the parafoil, from the handlebars. This permits both the motorcycle and the parafoil to be controlled independently, to adjust for surface irregularities, slight crosswinds or gusts, etc.

U.S. Pat. No. 4,749,149 issued on Jun. 7, 1988 to Peter Gruich, titled "Ornithopter-Type Vehicle, And Methods Of Constructing And Utilizing Same," describes a flying machine utilizing the rearward portion of a motorcycle as the propulsion and seating unit. The motorcycle engine drives a hydraulic pump, which in turn drives hydraulic cylinders for cycling the wings and adjusting the empennage assembly. The motorcycle engine does not drive the rear wheel, but is used solely as the flight propulsion engine. The ornithopter wings of the Gruich machine are semi-rigid, as opposed to the completely foldable fabric material of the parafoil wing of the present invention. Moreover, Gruich does not provide lateral stabilizer wheels, as he claims vertical takeoff and landing capability and provides only shock mounted pads.

U.S. Pat. No. 4,930,724 issued on Jun. 5, 1990 to Stephen L. Snyder, titled "Powered Airfoil Canopy Aircraft," describes a "trike" as such devices are generically termed, having a single nose wheel and two laterally spaced rear wheels. None of the wheels are driven. The only propulsion comprises a pair of engines which drive two counter rotating propellers through a common transmission. The two propellers may be stopped essentially vertically, to provide a narrow width for ground storage of the machine. However, the propeller guard must be disassembled, rather than being foldable as in the present invention. It is also noted that Snyder uses common controls for both ground steering and in flight lateral control. The disadvantages of such a system during the transition to and from flight, have been noted further above.

U.S. Pat. No. 4,934,630 issued on Jun. 19, 1990 to Stephen L. Snyder, titled "Powered Airfoil Canopy Aircraft," is a continuation in part of the '724 U.S. Patent to the same inventor, described immediately above. The same points noted in the discussion of the Snyder '724 U.S. Patent, are seen to apply here as well.

U.S. Pat. No. 5,078,335 issued on Jan. 7, 1992 to Jean-Pierre David, titled "Device Making It Possible To Convert A Motorcycle Into A Motorized Ultralight Aircraft," describes a generally ovoid, overhead structure which is welded to the frame of the motorcycle. The structure includes cable runs for actuating steering controls in the parafoil lift device used for flight, with toggle controls also being provided for in-flight steering. The propellers used for flight propulsion are powered by the conventional motorcycle engine, rather than by a separate engine as in the present invention. The David system uses a clutching and declutching mechanism to engage the propeller drive from a chain or belt drive extending from the engine or transmission of the motorcycle. David fails to provide any form of lateral safety structure for his machine, nor does he provide any lateral stabilizing wheels for transition between flight and ground operation, as provided by the present combination motorcycle and powered parafoil invention.

U.S. Pat. No. 5,160,100 issued on Nov. 3, 1992 to Stephen L. Snyder, titled "Airfoil Canopy Aircraft," describes a radio control model aircraft powered by an electric motor which drives a propeller. The aircraft has a tricycle landing gear configuration, with a streamlined fuselage and motor shroud or cowling. No power is provided to drive any of the relatively small wheels of the aircraft. While Snyder describes the aircraft as qualifying for ultralight status, i.e., a slow, light weight aircraft for carrying a single person, the use of electric power would preclude any significant flight duration. No steering is provided for the nose wheel of the Snyder aircraft, either independently of or in concert with the lateral flight controls.

U.S. Pat. No. 5,593,111 issued on Jan. 14, 1997 to Troy Jackson et al., titled "Safety System For Removing A Rider From A Vehicle By Deploying A Parachute," describes a rapidly deployable, or inflatable, parafoil which is worn by a motorcycle rider in a folded and stored configuration. Sensors are provided which deploy the chute when a condition of excessive banking, deceleration, etc. are detected, thus pulling the rider from the motorcycle. The Jackson et al. device does not attach to the motorcycle at all, but rather teaches away from such attachment, as the goal of Jackson et al. is to separate the rider from the motorcycle. Accordingly, no in flight propulsion or flight control systems are provided by Jackson et al. for their parachute, nor is any means provided for attaching any part of the device to a motorcycle or for steering or controlling the device from a motorcycle or otherwise.

U.S. Pat. No. 5,901,924 issued on May 11, 1999 to Louis C. Strieber, titled "Speed Enhanced Powered Parachute," describes a power and occupant unit supported by a flexible fabric surface parafoil lifting device. The parafoil includes means for adjusting the chord and thickness thereof, and a series of chordwise rigid structures are provided for adjusting the angle of attack of the parafoil wing as the chord and thickness are adjusted to alter the coefficient of lift of the device. No wheels or powerplant for operating the device on the surface is disclosed by Strieber.

German Patent Publication No. DE-3,430,412 published on Feb. 27, 1986 to Gerd Rienks describes (according to the English abstract and drawings) a motorcycle having a Rogallo type wing installed thereon. The device thus generally resembles that of the '810 U.S. Patent to Malewicki, discussed further above, with many of the points of difference noted between that device and the present invention also applying here. However, the device of the '412 German Patent Publication also includes a rearward propeller driven from rollers bearing against the rear wheel of the motorcycle, substantially in the manner of the device of the Poling '207 U.S. Patent discussed further above. The present invention differs in that it uses a separate, dedicated flight powerplant, rather than using the conventional motorcycle engine, as was noted in the discussion of the Poling '207 U.S. Patent. Other differences, e.g., the lack of a peripheral safety structure, lack of any form of propeller guard, different control system, etc. in the device of the '412 German Patent Publication, are noted as well.

European Patent Publication No. 278,784 published on Aug. 17, 1988 to Powerchute Systems International Limited, titled "Light Aircraft," describes a "trike" type powered parachute or parafoil having a tricycle wheel occupant and engine carriage, supported by a parafoil wing in flight. The device is essentially conventional, as such aircraft have been flying for years before the development of the present invention. The Powerchute device provides an improvement in that it provides lateral adjustment to compensate for the effects of torque from the single propeller installed on the machine. However, no system for propelling the ground wheels, peripheral protective structure, foot operated flight directional controls, etc., are disclosed in the '783 European Patent Publication, which features form parts of the present invention.

Finally, Japanese Patent Publication No. 3-167,099 published on Jul. 18, 1991 to Masaharu Fukigoshi describes (according to the English abstract and drawings) an inflated parafoil wing structure having sufficient rigidity to support a separate inflated trailing edge portion which is movable relative to the main wing portion. The trailing edge portion may be deflected upwardly and downwardly to adjust the coefficient of lift of the entire airfoil assembly. However, only a general occupant and engine platform is illustrated. No means of powering the ground wheels, folding propeller guard, peripheral safety structure, adjustable lateral wheels, etc., is apparent in the '099 Japanese Patent Publication.

None of the above inventions and patents, either singly or in combination, is seen to describe the instant invention as claimed.

SUMMARY OF THE INVENTION

The present invention comprises a combination powered parachute and motorcycle vehicle which is capable of travel both in flight and on the ground. The present invention utilizes an initially conventional motorcycle, motorbike, or other powered two wheel tandem machine. The motorcycle is modified with the installation of a peripheral and overhead safety structure, which also serves as the structure for securing the parafoil or other lifting device to the motorcycle structure. A second engine is installed behind the operator's seat, with the second engine serving as a flight engine to drive a propeller. The flight engine, its fuel and other systems, and propeller are completely independent from the conventional motorcycle engine used to power the rear wheel of the motorcycle on the ground. A flight instrument module and flight controls for lateral control are also provided.

A pair of laterally disposed stabilizing wheels is also provided for transition from the surface to flight, and back to surface operation upon landing. The stabilizing wheels include remotely actuated vertical adjustment means, as well as manual adjustment of the track or width of the lateral wheels. The propeller is preferably a four blade type, with every other blade pair having a relatively narrow angle therebetween to reduce the width of the assembly when its major axis is oriented vertically. The propeller guard includes means for folding the lateral portions thereof, to reduce the road width of the device. Alternatively, a smaller diameter propeller or fan may be installed in a small diameter, non-folding duct for aerial propulsion, if so desired.

The present combination motorcycle and powered parafoil is easily converted for use on the ground or in the air, as desired. For ground operation, the parafoil is folded and packed for storage over the flight engine, which in turn resides over the area conventionally used for a rear passenger on the motorcycle. The permanently mounted propeller is positioned with its major axis oriented vertically, in order to narrow the road width of the assembly. The propeller is surrounded by a circular guard, with the lateral portions of the guard being inwardly foldable in order to narrow the width of the assembly for road use. Finally, the laterally disposed stabilizer wheels are raised and manually retracted inwardly, with the machine then being operable essentially as a conventional motorcycle. Alternatively, the flight components may be removed from the motorcycle, if so desired.

For flight operations, the lateral wheels are extended and lowered for stability when the motorcycle wheels are stationary and are not providing gyroscopic stability. The propeller guard is unfolded and locked in place at its full width, and the parafoil is deployed behind the machine. The parafoil may comprise a ram air inflated chute, or more preferably may include at least a portion thereof which is pneumatically inflated. At this point the machine is essentially ready for flight, with flight control being provided by a pair of foot controls or pedals for steering the parafoil canopy laterally, as is conventional in the art, and altitude control being provided by a rotating throttle hand grip on the left handlebar, for controlling the power and thrust of the flight engine, as is conventional with powered parachutes and the like.

Accordingly, it is a principal object of the invention to provide a combination powered parachute and motorcycle vehicle, capable of travel both in flight and on the surface.

It is another object of the invention to provide such a combination machine utilizing an initially conventional motorcycle or the like as the ground transportation component and structure to which the flight components are secured.

It is a further object of the invention to provide a peripheral and overhead safety structure for the motorcycle to which the various flight components are installed, and a set of vertically and laterally adjustable lateral wheels for transitional stability.

Still another object of the invention is to provide a second engine for flight operations, with the flight engine and its fuel and other systems being completely independent of the conventional motorcycle engine used for ground operation.

Yet another object of the invention is to utilize a lifting device which may comprise a ram air inflated parafoil, or more preferably an inflatable airfoil of which at least a portion thereof is pneumatically inflatable.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 9 is a schematic drawing of the electrical and pneumatic system of the present invention, for controlling vertical operation of the lateral wheels.

Similar reference characters denote corresponding features consistently throughout the attached drawings.

DETAILED DESCRIPTION OF THE PREFERRED EMBODIMENT

The present invention is a hybrid vehicle, capable of both land and air operation with minor reconfiguration for each type of operation. The basic vehicle is a motorcycle having an initially conventional configuration before modification for use as the ground vehicle and basis for the flight vehicle configuration of the present invention. The motorcycle is modified by the addition of a series of components permitting flight as a powered parachute type aircraft. The present powered parachute and motorcycle vehicle is quickly and easily reconfigured between its flight and ground operation modes, when the flight operation components are carried with the vehicle.

Figure 1:
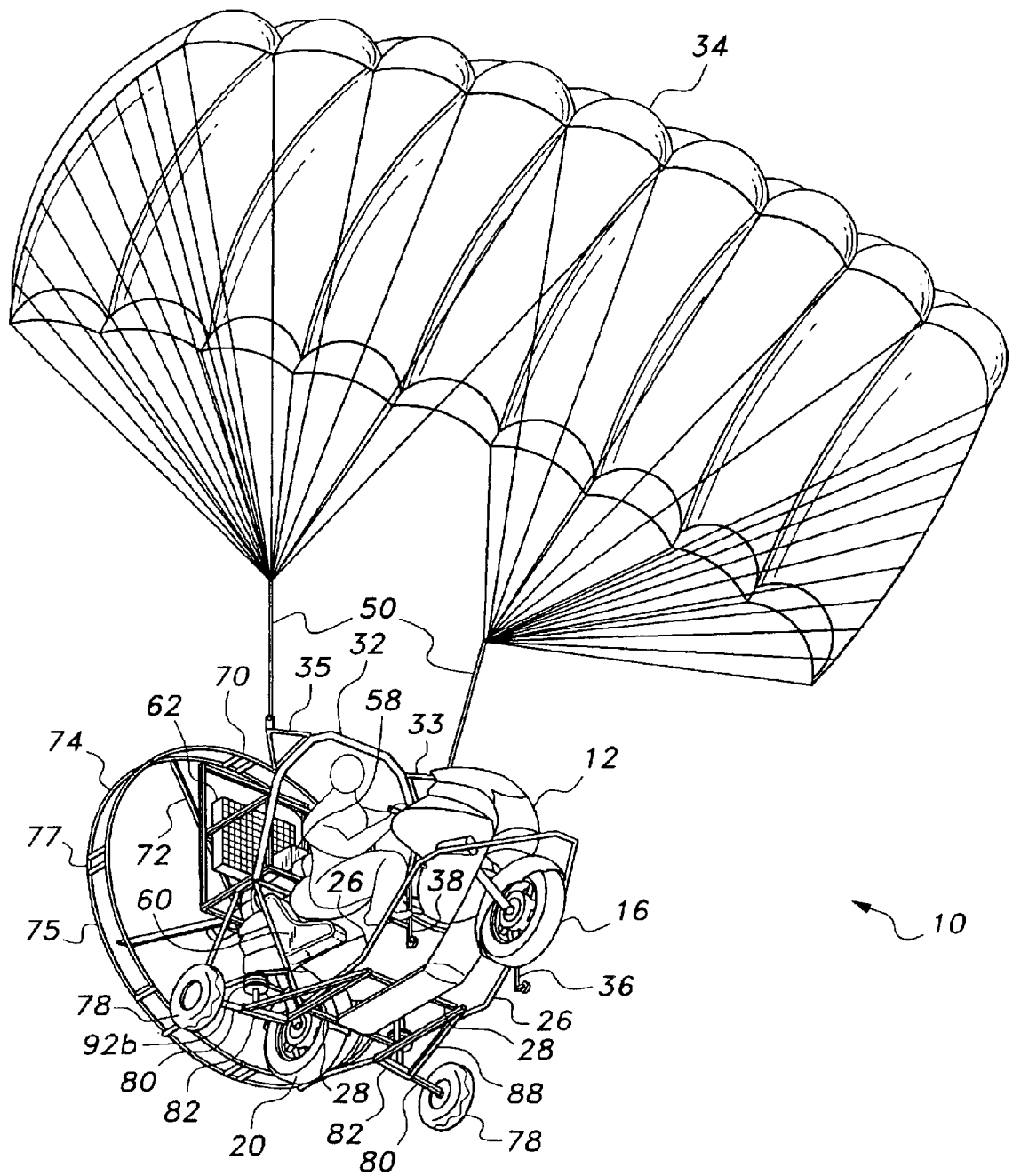
FIG. 1 is an environmental perspective view of a combination powered parachute and motorcycle in its flight mode, according to the present invention.

FIG. 1 of the drawings is an environmental perspective view of the present combination powered parachute and motorcycle vehicle 10 in its flight configuration. The present vehicle 10 includes an initially conventional motorcycle 12, with the motorcycle frame 14 (a portion of which is shown in broken lines in FIG. 3 of the drawings, beneath streamlining fairings) serving as an attachment structure for the various flight componentry used to form the present invention. The motorcycle 12 includes a directionally controllable front wheel 16 having handlebar controls 18 (illustrated in other drawing Figs.) or other directional control means, as is conventional in the art. The rear wheel 20 of the motorcycle 12 is powered by a ground engine 22 (shown in broken lines in FIG. 3, beneath the fairings), with the ground engine 22 controlled by a conventional hand grip throttle 24 (shown in other drawing Figs.).

A generally peripheral flight component attachment and safety structure 26 is attached to the frame 14 of the motorcycle 12, with attachment structure crossmembers 28 extending laterally therebeneath and attaching to the frame 14 of the motorcycle 12. Additional attach points between the flight component attachment structure 26 and motorcycle frame 14 are provided at various points, e.g., upper forward crossmember 30 shown particularly in FIGS. 5 and 6, depending upon the specific configuration of the motorcycle 12 used as the basis for the present combination vehicle 10. The attachment and safety structure 26 is preferably bolted to the frame 14 of the motorcycle 12, in order to allow the structure 26 to be removed if so desired. While removal of the structure 26 and accompanying flight components requires at least a few hours of time, it is anticipated that the structure may be modified to accept easily removable and installable components (e.g., quick release pins, etc.) to facilitate the installation and removal of the flight components, if so desired.

Figure 2:
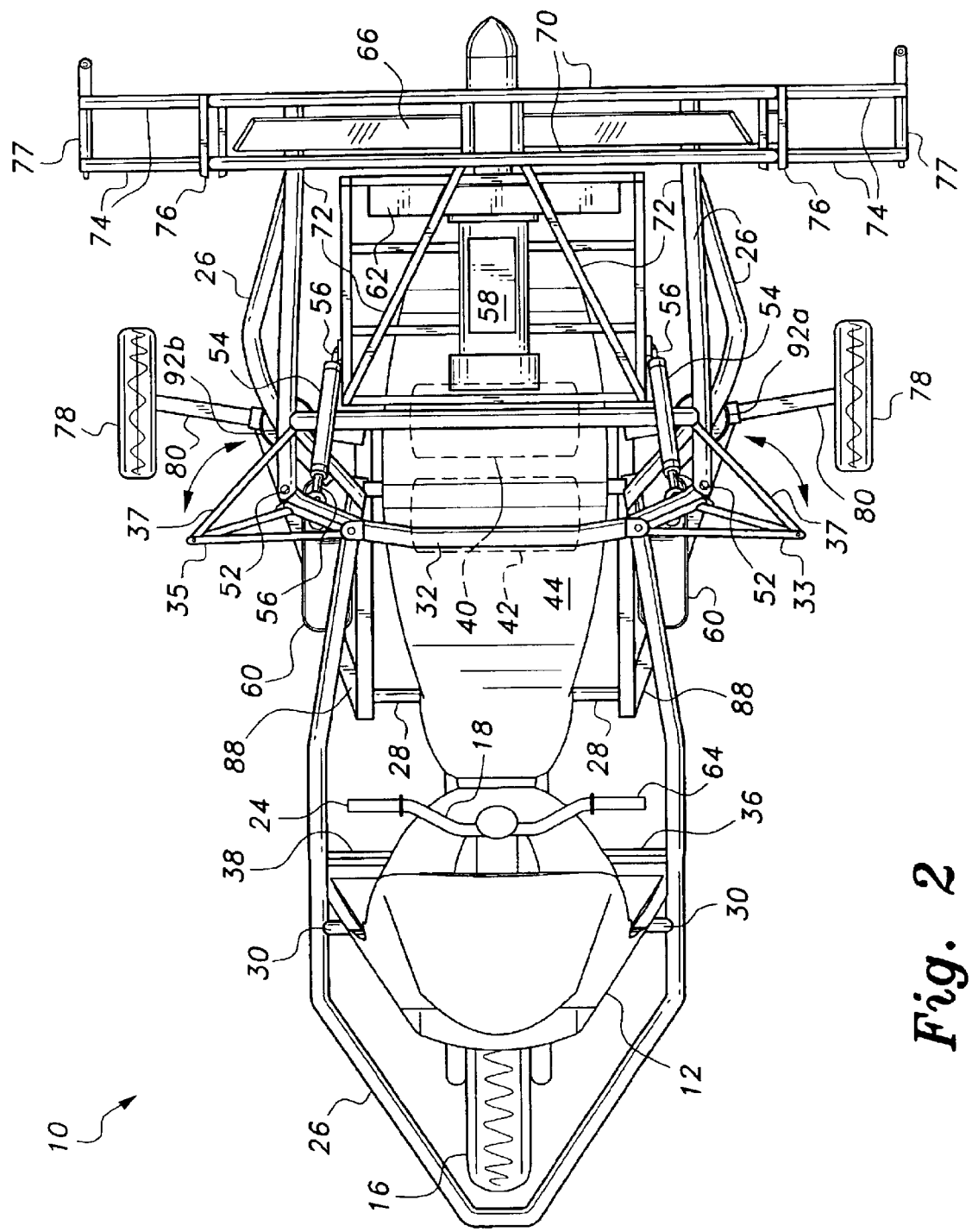
FIG. 2 is a top plan view of the modified motorcycle structure of the present invention, illustrating the peripheral safety structure, laterally disposed stabilizing wheels, general engine, propeller, and propeller guard installations, and other features.
Figure 3:
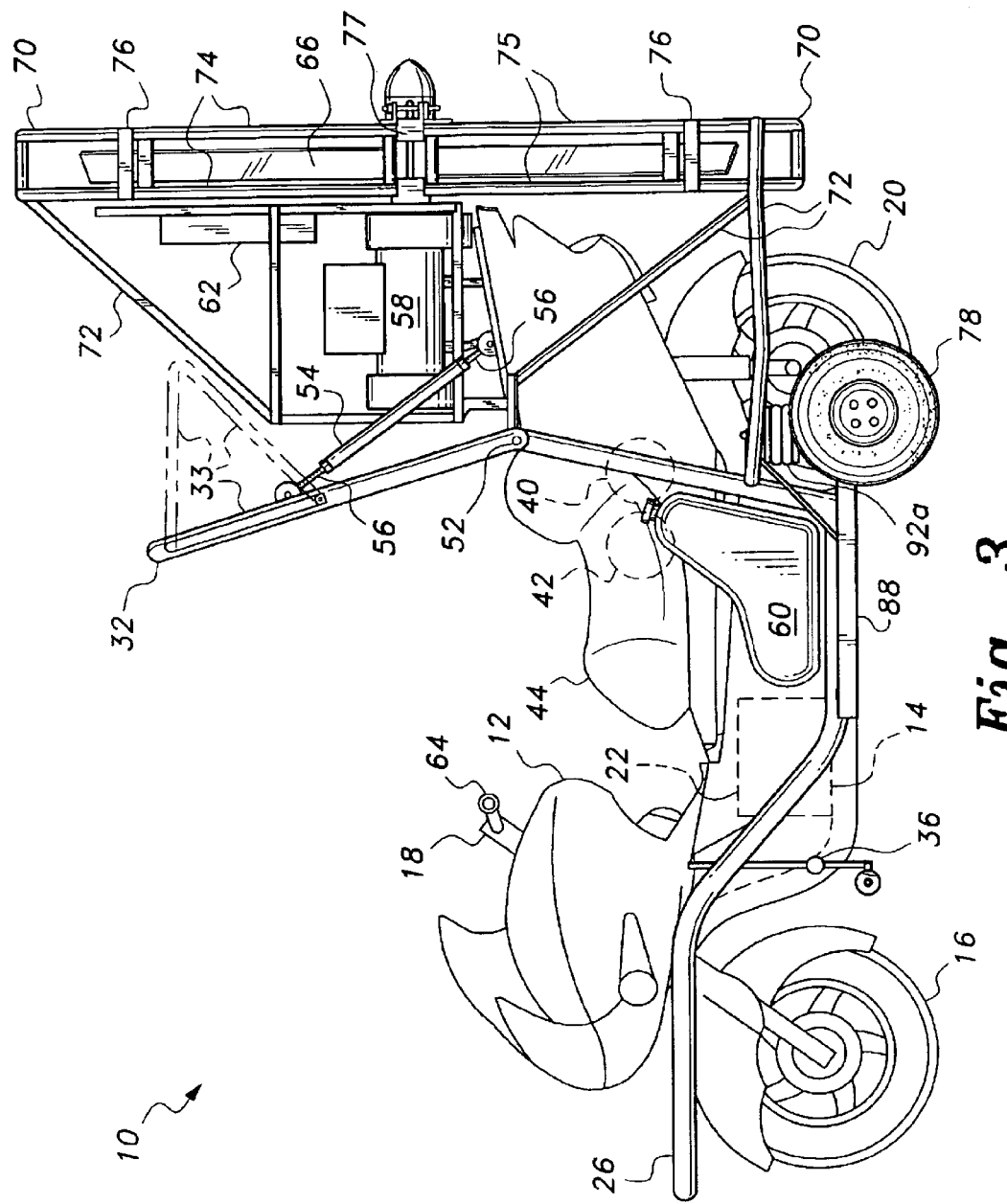
FIG. 3 is a left side elevation view of the motorcycle structure and flight components of FIG. 2, showing further details thereof.

The flight component attachment and safety structure 26 includes an overhead lateral parafoil attachment bar 32 extending from the structure 26, with a pair of laterally opposed left and right parafoil attachment extension arms, respectively 33 and 35, extending therefrom. These extension arms 33 and 35 may be folded inwardly, as shown in FIGS. 2 and 3 of the drawings, to narrow the overall width of the vehicle for road use. The arms 33 and 35 swing outwardly to provide a wider span for attachment of a parafoil 32 to the vehicle for greater in-flight stability, generally as shown in FIG. 1. The extension arms 33 and 35 are each secured in their extended positions by braces 37. The parafoil 34 is controlled conventionally by a pair of laterally opposed lines (not shown, for clarity in the drawings) which are controlled by respective left and right pedals 36 and 38. These parafoil control pedals 36, 38 are completely independent of the ground steering mechanism 18 which provides for directional control of the front wheel 16 of the machine while on the ground.

The parafoil 34 used with the present combination vehicle 10 is a conventional folding device having a lifting airfoil configuration. Such parafoils are commonly used on other light single and two place powered parachute "trike" aircraft, and provide reasonably good flight efficiency by means of their double surface structure, which is inflated to take on an airfoil shape by dynamic airflow through the structure due to forward motion of the aircraft through the air. Such ram air parafoils and their lateral steering means are well known in the art, and will not be described further.

More recently, semi-inflatable parafoils have been developed in which the leading edge "D" section is a pneumatically inflated, closed structure. Examples of such have been developed by Peter Lynn of New Zealand and by the F-One Company of France, and can be incorporated into the present invention. Such parafoils are inflated by suitable equipment before launch, and hold their airfoil shape throughout the launch and landing phases. These "hard chutes" also provide somewhat better (i.e., lower) drag coefficients than ram air inflated parafoils. Control of such pneumatically inflated parafoils is accomplished in the same manner as that used for lateral control with ram air inflated parafoils, with such pneumatically inflated parafoils being readily adaptable for use with the present combination powered parachute and motorcycle invention.

The present vehicle 10 may include onboard means for inflating such a pneumatically inflatable parafoil, as indicated in FIGS. 2 and 3 of the drawings. An electrically powered pneumatic pump 40 and a pneumatic reservoir 42 (air pressure tank) are installed beneath the motorcycle seat 44, as shown in FIGS. 2 and 3 of the drawings. The pump 40 and reservoir 42 are conventional, and are used both to inflate the pneumatically inflatable parafoil (if such is used with the present vehicle 10) and also for lowering the pneumatically actuated lateral stabilizing wheels, details of which are discussed further below. The pump 40 and airflow from the reservoir 42 are remotely controlled by a switch panel 46 located on the main instrument panel 48 of the vehicle 10 (shown in FIGS. 5 and 6 of the drawings), or in another convenient location as desired.

The parafoil 34 is attached to the arms 33, 35 extending from the overhead parafoil attachment bar 32, as noted further above, by conventional attachment, support and lateral control lines 50 and appropriate attachment fittings on the arms 33 and 35. As the motorcycle 12 and its flight components are suspended beneath the parafoil 34 from the arms 33 and 35 extending from the overhead bar 32, it will be seen that the longitudinal location of the bar 32 affects the nose up and nose down angle of the motorcycle 12 and flight components suspended therebelow. Accordingly, the present invention includes means for shifting the parafoil attachment bar 32 longitudinally, in order to provide the desired attitude for the motorcycle 12 and flight components suspended therebelow.

FIGS. 2, 3, 5, and 6 illustrate the means provided for longitudinally adjusting the position of the parafoil attachment bar 32, with the left side elevation view of FIG. 3 providing the clearest illustration of the bar adjustment system. The bar 32 is pivotally attached to the flight component attachment structure 26 by a pair of pivot bolts or pins 52 at each end of the bar 32. An adjustable link or strut 54 is installed between the upper rearward portion of the attachment structure 26 and each lateral portion of the bar 32. Each strut 54 includes an oppositely threaded rod end 56 at each end thereof, with a lock nut provided to lock the overall strut length as desired. Rotation of the central portions of the struts 54 results in the corresponding rod ends 56 being threaded outwardly or inwardly relative to the strut bodies 54, thus lengthening or shortening the overall strut length as desired.

If it is desired to raise the front of the cycle 12 and its flight componentry when airborne, then the overhead central portion of the parafoil attachment bar 32 must be moved forwardly. This is accomplished by lengthening the overall length of the bar adjustment struts 54 by turning the central body thereof to unscrew the two attachment rod ends 56 therefrom until the desired adjustment is reached. The front of the motorcycle 12 and attached components may be lowered by turning the central bodies of the struts 54 in the opposite direction, thereby threading the rod ends 56 further into the bodies to shorten the struts 54, thus drawing the parafoil attachment bar 32 rearwardly. Adjustment may be made as desired, for different operator weights, etc.

Power for propelling the vehicle 10 in flight is provided by a flight engine 58 which is installed above the rearward portion of the seat 44 of the vehicle 10. The flight engine 58 is completely separate and independent from the ground or road engine 22, which provides power solely to the rear wheel 20 of the motorcycle 12 for ground operation in the conventional manner. While any suitable engine type may be used, the flight engine 58 is preferably a multicylinder two stroke cycle engine, selected for its relatively high power output relative to its weight. Such engines require oil to be mixed with their fuel, if the engine is not equipped with an oil injection system. Accordingly, the present combination vehicle 10 includes an independent fuel system having a pair of laterally disposed fuel tanks 60, separate from the conventional motorcycle fuel tank. The flight engine 58 also has its own electrical system and cooling system (radiator 62, where liquid cooling is used).

The flight engine 58 is preferably controlled by a twist grip hand throttle 64 on the left end of the handlebar assembly 18, similar to (but completely separate and independent from) the conventional right hand twist grip throttle 24 for controlling the ground engine 22 of the motorcycle 12. This independent arrangement of the power controls 24 and 64 for the separate ground and flight engines 22 and 58 provides significant advantages in operation, with the operator being able to accelerate the vehicle 10 much more rapidly for takeoff by using the conventional ground engine 22, before taking flight by means of the power developed by the flight engine 58.

Thus, the present combination vehicle has completely separate and independent controls for flight and ground operations, both for steering or lateral control and also for forward thrust and vertical flight control. Lateral ground control is accomplished by means of the conventional handlebars 18 or other steering means (as well as by leaning or banking the motorcycle 12 into turns). In flight lateral control is accomplished by means of the conventional lateral lines (not shown, for clarity in the drawing Figs.) which run from the left and right flight control pedals 36 and 38 to the respective sides of the parafoil 34. Vertical control in flight is accomplished conventionally according to the power output of the flight engine 58, with power greater than required for level flight resulting in a climb, and a reduction in power to less than that required for level flight, resulting in a descent, as is conventional with powered parachute type aircraft.

Figure 5:
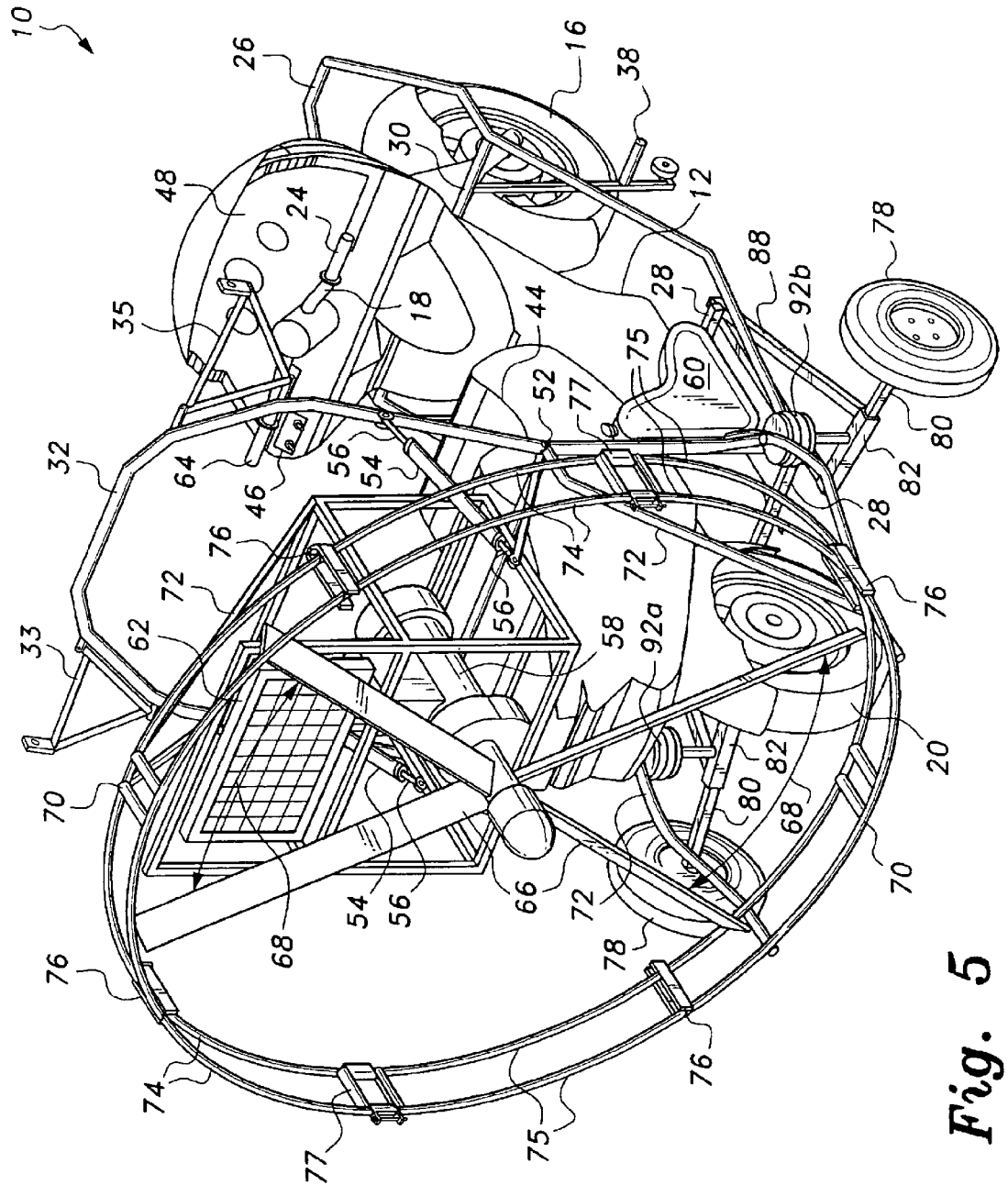
FIG. 5 is a right rear perspective view of the present invention, showing the laterally extended stabilizer wheels and the unfolded propeller guard ready for flight.

The flight engine 58 drives a rearwardly positioned pusher propeller 66, for in flight thrust. The propeller 66 is preferably a multiblade type, in order to reduce the overall diameter of the unit. However, rather than using a conventional equal angular spacing between each of the blades in a conventional propeller, the present propeller 66 comprises four blades, with alternate angular blade spacing of sixty degrees and one hundred twenty degrees around the circular pattern encompassed by the four blades. This allows the blades to be aligned with their sixty degree angular spacing 68 at top and bottom, as shown in FIGS. 5 and 6, to narrow the overall blade assembly for road travel, as described below.

The present combination vehicle 10 also has a propeller guard, as is conventional with powered parachute type aircraft to keep the parafoil and shroud lines clear of the rotating propeller during operation. However, the propeller guard of the vehicle 10 includes lateral folding means, in order to narrow the width of the guard (and overall vehicle width) to facilitate operation on surface roadways. The present propeller guard includes a central fixed portion 70, which is attached to the flight component attachment structure 26 by a series of rearwardly extending struts and braces 72. The left and right laterally outboard propeller guard portions each comprise an upper and a lower portion, respectively 74 and 75, which are foldably attached to the central portion 70 by a series of hinge brackets 76 or the like, which allow the upper and lower lateral portions 74 and 75 to fold inwardly toward the propeller hub for ground operation of the machine.

Figure 6:
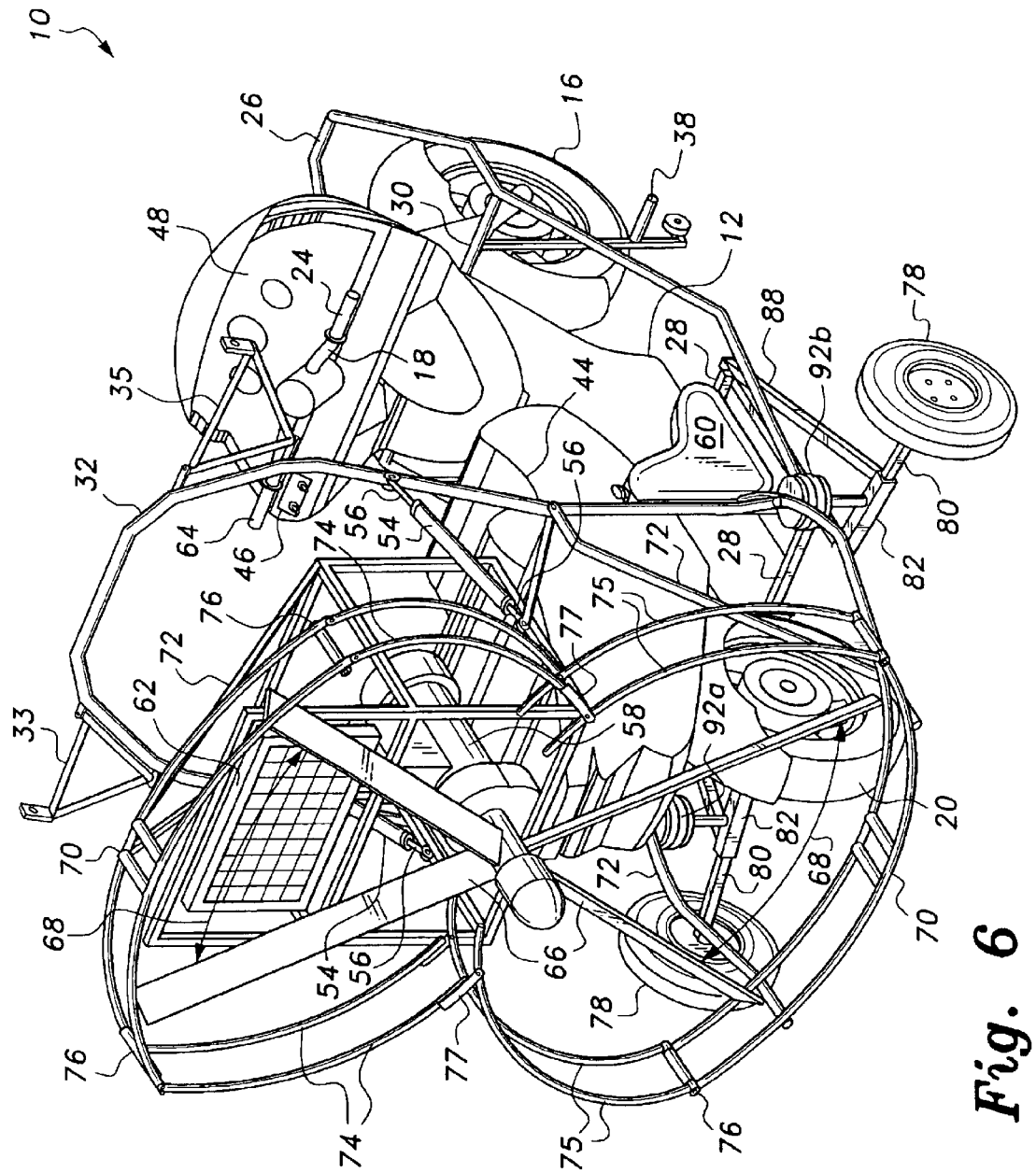
FIG. 6 is a right rear perspective view similar to that of FIG. 5, but showing the two sides of the propeller guard inwardly folded for ground operation of the machine.
Figure 7:
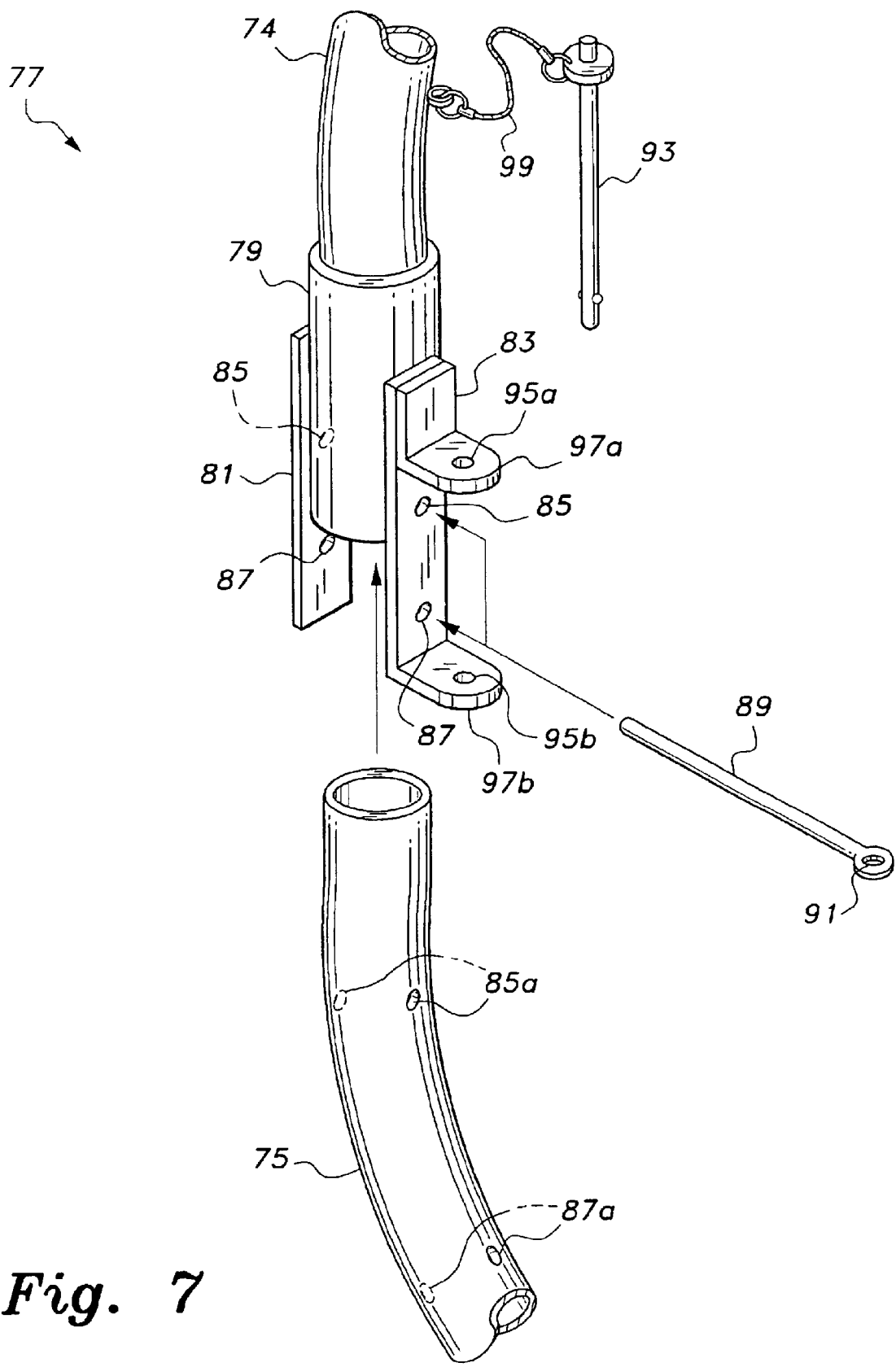
FIG. 7 is an exploded, detail perspective view of one of the propeller guard tubes, showing the assembly of the components for deploying the guard.
Figure 8:
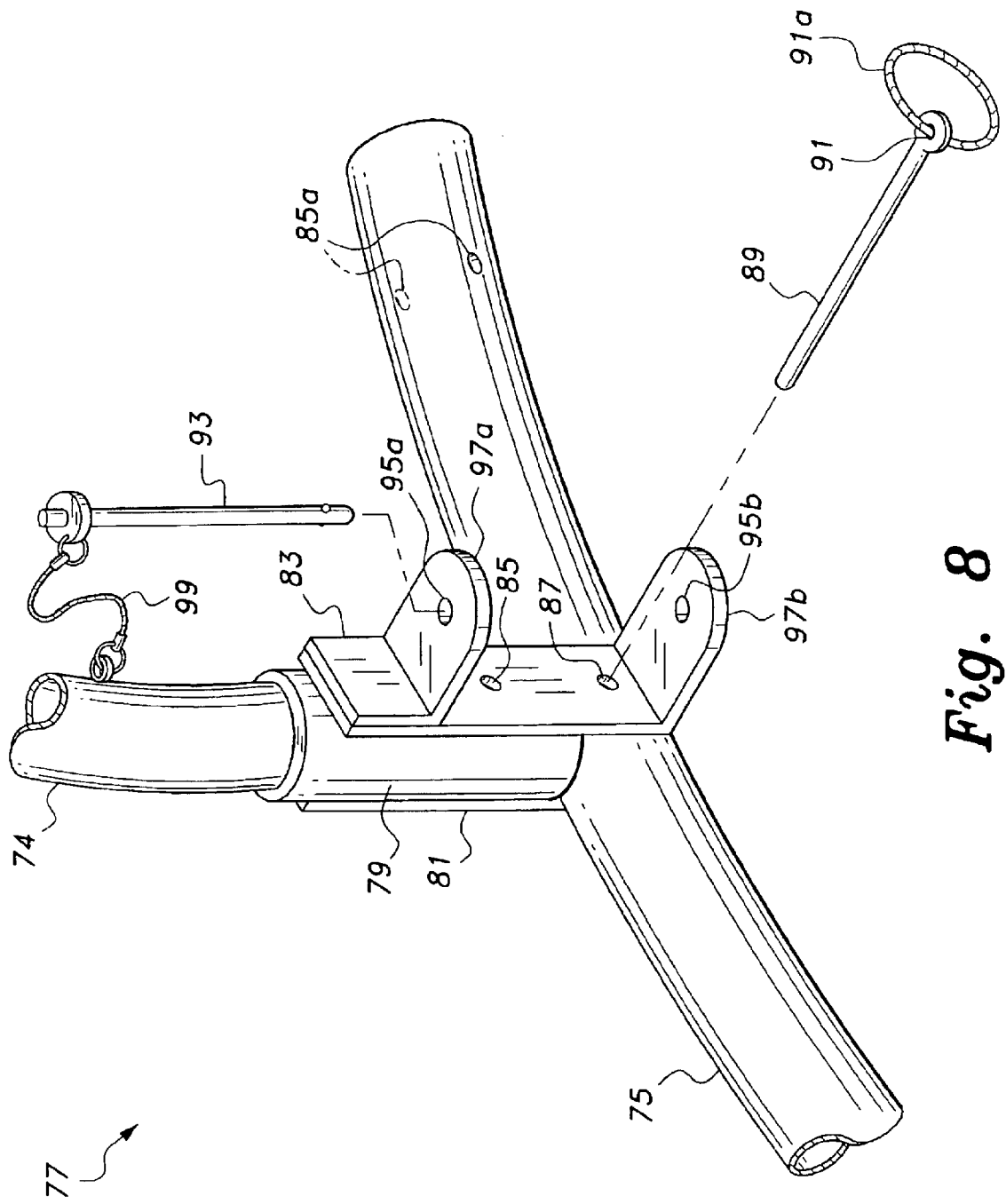
FIG. 8 is an exploded, detail perspective view of one of the propeller guard tubes, showing the assembly of the components for folding the guard.

This folding action is shown clearly in FIG. 6, with the lateral portions 74 and 75 being folded inwardly from their extended positions. FIGS. 7 and 8 illustrate the connection details of one of the connector assemblies 77 for the two folding portions 74 and 75 of the propeller guard. In FIG. 7, one of the lower folding outboard members 75 is shown removed from its connection with the corresponding upper member 74. The upper member has a socket 79 at its lower end, into which the lower member 75 end is inserted for deployment of the guard in its laterally extended configuration for flight. The socket 79 includes a pair of opposed brackets, respectively 81 and 83, between which the lower member 75 end is inserted for deployment of the guard. The brackets 81 and 83 each include two matched sets of holes, respectively 85 and 87, with the lower folding member 75 end having corresponding matched hole sets 85*a* and 87*a*.

The connector 77 is assembled by extending the two folding propeller-guard sections 74 and 75 outwardly to align the end of the lower guard member 75 with the socket 79 of the upper guard member 74, and inserting the end of the lower guard member 75 into the upper guard member socket 79 until the respective holes 85, 85*a* and 87, 87*a* are aligned with one another. A retaining pin 89 having an eye 91 is installed through the second set of holes 87, 87*a*, to secure the end of the lower member 75 between the two brackets 81 and 83 and in the socket 79 of the upper member 74. The pin 89 extends completely across the pair of members comprising each of the two joined propeller guard rings; thus, only a single pin 89 is required. The pin 89 is secured in place by a push button release or "pip" pin 93, which is inserted through a pair of holes 95*a* and 95*b* in respective tabs 97*a* and 97*b* extending from the second bracket 83, and through the eye 91 of the retaining pin 89. The pip pin 93 may be secured to the structure by a tether 99, to prevent its loss.

FIG. 8 illustrates details of the propeller guard connector 77 in its inwardly folded and secured state, as shown generally in FIG. 6 of the drawings. In FIG. 8, the end of the lower guard member 75 has been withdrawn from the socket 79 of the corresponding upper guard member 74, and both guard members 74 and 75 have been folded inwardly toward the propeller hub, with the end of the lower member 75 being at approximately a ninety degree angle to the end of the upper member 74. The end of the lower member 75 is placed between the two brackets 81 and 83 of the upper member 74, with the second holes 87*a* of the lower member 75 (shown in FIG. 7) being aligned with the second holes 87 of the brackets 81 and 83. The retaining pin 89 is then inserted through the aligned holes 87 and 87*a* respectively of the brackets 81 and 83 and lower member 75 to secure the assembly together in its folded configuration. The pip pin 93 is inserted through the two holes 95*a* and 95*b* of the respective tabs 97*a* and 97*b* and through the eye 91 of the retaining pin 89, to secure the pin 91 in place. (Alternatively, the pin 89 may have a loop 91*a* installed in the eye 91, with the pip pin 93 passing through the loop 91*a* of the retaining pin.) The folding propeller guard lateral portions 74, 75 and the sixty degree arcuate spacing between opposite propeller blade pairs, along with the folding parafoil attachment arms and laterally retractable lateral stabilizing wheels discussed below, enable the width of the present vehicle 10 to be narrowed to a lateral span of no more than four feet or so, for convenient ground operation and storage.

An alternative propulsion means comprising a ducted fan or relatively small diameter shrouded propeller (not shown) may be provided in lieu of the propeller 66 and guard assembly, if so desired. Such a ducted fan or propeller system provides several advantages, in that the shroud also serves as a guard for the propeller to some extent. The shroud also greatly reduces tip losses for the propeller, thereby allowing a lower aspect ratio and smaller diameter propeller blade without significant loss of efficiency. This allows the diameter of the propeller and shroud to be reduced to the extent that folding of the shroud and/or propeller is not required to meet a reasonable width for road use of the present vehicle. Also, ducted fan installations generally allow a higher propeller RPM, which may obviate need for a costly and complex gear reduction system for the propeller.

It is well known that the basic principle of stability upon which motorcycles and other two tandem wheeled vehicles rely, is gyroscopic effect. The spinning of the wheels of such vehicles while in motion, creates a "rigidity in space" effect for their axes which tends to keep the vehicle upright. However, this effect is lost when the wheels (or other rotary mass) are not rotating, as would be the case upon landing the present combination vehicle 10. It is also critical that the vehicle 10 remain upright during the time the stationary vehicle is being readied for takeoff, with the flight engine 58 operating, propeller 66 rotating, and the parafoil 34 being inflated behind the vehicle 10.

Figure 4:
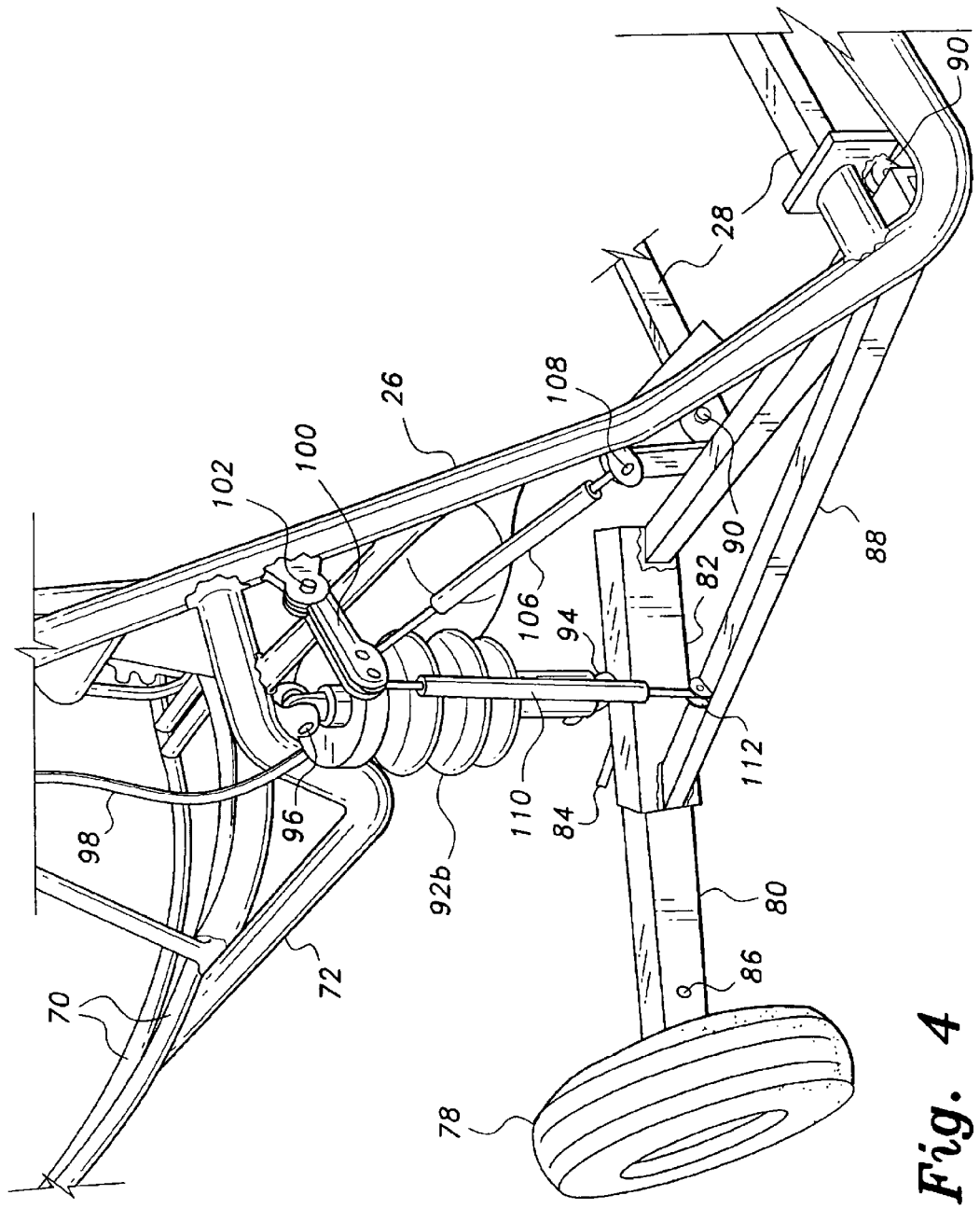
FIG. 4 is a detailed perspective view of the right side lateral or outrigger wheel assembly, showing its vertical pneumatic and lateral manual adjustment means and structure.

Accordingly, the present combination vehicle 10 includes lateral stabilizing wheels 78 adjustably extending to each side of the vehicle. FIG. 4 of the drawings provides a detailed perspective view of the right side lateral wheel 78 and its operating components. Each wheel 78 rotates on an axle extending from the outboard end of a strut 80, which in turn telescopes within a larger tube 82. The outboard portion of the larger tube 82 includes a spring loaded, transverse locking pin 84 (the handle of which may be seen in FIG. 4), which passes selectively through one of two holes 86 formed in the outboard strut 80. The locking pin 84 allows the operator of the present combination vehicle 10 to selectively and manually adjust the span of the lateral wheels 78 as desired, retracting the outer struts 80 inboard for normal ground operation and extending the outer struts 80 further outboard for stability on the surface during flight operations.

Each larger inboard strut tube 82 forms the rearward side of a triangular lateral wheel support frame 88, which is pivotally attached to the peripheral flight component attachment structure 26 at forward and rearward pivot points 90. Left and right pneumatically inflatable struts 92a and 92b are installed between respective pivot points 94 on the outer member of each lateral wheel support frame 88 and respective fixed attachment points 96 of the peripheral frame structure 26, or more precisely, from the lower propeller guard attachment brace 72 extending rearwardly therefrom. An inflation line 98 extends from each pneumatic strut 92a and 92b to the pneumatic reservoir 42 (shown in FIGS. 2 and 3) beneath the seat 44 of the vehicle 10, to provide a source of pressure for the selective extension of the pneumatic struts 92a, 92b as desired. Strut inflation control is provided by the switch panel 46 (shown in FIGS. 5 and 6, and in further detail in FIG. 9), for vertically extending each lateral wheel strut 80 and corresponding wheel 78 as desired.

The above described pneumatic actuation system for the lateral wheels 78 enables the wheels 78 to be extended downwardly as desired to provide lateral support for the combination cycle vehicle 10 during deployment of the flight components and after landing after a flight, and also provides differential downward extension of each wheel, for support on the surface while turning the vehicle. The above described mechanism allows the lateral wheels to be extended downwardly to be level with, or even slightly below, the rear wheel 20 of the vehicle 10, as desired. The pneumatic system of the present vehicle 10 is capable of providing relatively high pressure (e. g., 150 psi) for pneumatic strut inflation, or relatively low pressure and high volume for inflation of a pneumatic parafoil, if such is used with the vehicle.

The above described pneumatic extension system is relatively simple in order to save weight and complexity, in that it provides only positive pressure for the extension of the pneumatic struts 92a and 92b; no pneumatically operated retraction system is provided. When it is desired to raise the two outboard wheels 78, some other means of retracting or collapsing the struts 92a and 92b is required.

This is accomplished by a retraction linkage which operates once air has been released from the pneumatic struts 92a and 92b. A pivoting arm 100 extends from an attachment point 102 on the peripheral flight component attachment structure 26, with a pair of struts or links being attached to the outer or distal end 104 of the pivoting arm 100. The first or compression link 106 is a spring loaded (e.g., mechanical spring, pneumatically inflated, etc.) strut or cartridge, similar to those conventionally used in automobiles for holding a trunk or hatch lid in the open position. This link 106 is captured between a fixed attachment point 108 on the peripheral flight component attachment frame 26 and the distal end 104 of the pivoting arm 100, and is compressively biased to urge the pivoting arm 100 generally upwardly, away from the first link lower attachment point 108. A second or tension link 110 has a fixed length (although one or both ends may be manually adjustable in length), and extends between the outboard or distal end 104 of the pivot arm 100 and an attachment pivot point 112 affixed to the outboard arm of the lateral wheel support frame 88 to apply a tensile force therebetween.

The above described system operates to automatically retract the corresponding pneumatic extension strut 92a and/or 92b, once pneumatic pressure has been released from the struts 92a, 92b. The first or compression link 106 provides sufficient compressive strength to overcome the weight of the lateral wheel frame 88, lateral strut 80, and associated wheel 78, yet the compression of this link 106 is easily overcome by the pneumatic strut 92a or 92b when pneumatic pressure is applied thereto to lower the lateral wheel assembly. Thus, the compression link 106 can extend and compress between its fixed attach point 108 on the peripheral frame structure 26 and the movable outboard end 104 of the pivot arm 100, and extends to raise the pivot arm 100 when pressure is relieved in the pneumatic struts 92a and/or 92b.

When the pivot arm 100 is raised, it also draws the fixed length second or tension link 110 upwardly. As the tension link 110 connects the outboard end 104 of the pivot arm 100 to the lateral wheel frame 88, the wheel frame 88 is also drawn upwardly as the pivot arm 110 is driven upwardly by the extension of the first or compression link 106, thereby automatically raising the lateral wheel 78 whenever pneumatic pressure is released from the pneumatic strut 92a and/or 92b. Reinflation of the pneumatic strut 92a and/or 92b is sufficient to overcome the compression of the first link 106 and draws the tension link 110 downwardly as the lateral wheel frame 88 and wheel 78 are lowered, thereby drawing the outboard end 104 of the pivot link downwardly to compress the compression link 106.

FIG. 9 provides a schematic diagram of the system used for collectively or differentially inflating the two pneumatic shock struts 92a and 92b. The compressor 40 is actuated by means of an on/off switch 114 on the pneumatic control switch panel 46, with the compressor 40 providing air under pressure to an air reservoir tank 42 via an air line 116. The compressor 40 and reservoir 42 may be located under the seat 44, generally as shown in FIGS. 2 and 3 of the drawings. Once the compressor switch 114 has been activated, pressure developed by the compressor 40, and thus delivered to the air reservoir 42, is automatically controlled by a conventional pressure switch 118.

Pressurization of either or both of the two pneumatic shock struts 92a and/or 92b may be accomplished in either of two ways. One control means is achieved by left and right control switches, respectively 120a and 120b, which may be located on the switch panel 46. These two switches 120a and 120b may be used to selectively increase pressure in their respective pneumatic struts 92a and/or 92b, thereby extending the strut(s) 92a and/or 92b, or to release pressure in the strut(s) 92a and/or 92b, thereby retracting the strut(s) by means of the linkage described further above. The two switches 120a and 120b communicate electrically with a dual pneumatic actuator solenoid 122, which receives air under pressure from the reservoir 42 by an air delivery line 123. The electrical wiring between the switches 120a, 120b and the actuator solenoid 122 is not shown, but is conventional. Two pneumatic lines, respectively 124a and 124b, extend between the dual solenoid 122 and a dual indicator gauge 126, which indicates the pressure of each pneumatic strut 92a and 92b.

The above described strut control system, using the rocker switches 120a and 120b on the switch panel 46, is normally used when readying the vehicle 10 for flight. Selection of either the rocker switches 120a and 120b, or other strut control switches, may be accomplished by means of a "Road/Flight" selector switch 128 on the switch panel 46. The Road/Flight selector switch 128 is switched to the flight position in order to allow the operator to adjust the two pneumatic struts 92a and/or 92b as desired.

When ground operation is to be conducted, the Road/Flight switch 128 is switched for road operation, which disables the two control switches 120a and 120b on the switch panel 46 and activates separate left and right foot control switches, respectively 130a and 130b, which operate the dual pneumatic solenoid 122 by means of a dual relay 132. The foot switches 130a and 130b may be operated to differentially control either of the pneumatic struts 92a or 92b, inflating one of the struts while releasing pressure on the opposite strut to allow it to retract by means of the mechanism described further above. This allows the vehicle to be leaned into turns, rather than maintaining pressure in both struts, which would result in the vehicle remaining upright around turns and being unable to bank into the turns, as is conventional with two wheeled vehicles.

The present combination powered parachute and motorcycle 10 is operated as a conventional motorcycle in its surface or ground operation configuration. In this configuration, the lateral wheels 78 are manually retracted inwardly and raised above the rear road wheel 20 of the motorcycle 12, by relieving pneumatic pressure in the lateral wheel pneumatic strut system as described further above. The propeller 66 is stopped with its narrower dimension oriented laterally, i.e., with the sixty degree arcuate span between blades oriented at the top and bottom of the propeller, and the upper and lower folding portions 74 and 75 of the propeller guard are folded inwardly and locked in place beside the propeller 66. The parafoil 34 is quite compact when deflated, and is easily carried in the framework area above the flight engine 58 and forward of the radiator 62. As the flight engine 58 is not operating during such ground operation, no airflow through the flight radiator 62 is required, and the folded parafoil 34 does not interfere with any flight or ground componentry in this location.

The present vehicle 10 is quickly and easily readied for flight by manually extending the two outboard lateral wheel struts 80 and pneumatically lowering the strut assemblies 88 and their associated wheel struts 80 and wheels 78, to support the vehicle 10 in an upright position as the vehicle is further readied for flight. The upper and lower outboard portions 74 and 75 of the propeller guard are unfolded and extended, and the parafoil 34 is unpacked from its location above the flight engine 58 and deployed behind the vehicle 10. In the event that an inflatable parafoil is used, the parafoil is inflated at this point.

Once the above steps have been accomplished, all that remains is to start and warm up the flight engine 58, check all appropriate systems, and apply power to the flight engine 58 for takeoff. If the rear drive wheel 20 of the motorcycle 12 remains in contact with the surface, an even more rapid takeoff may be provided by accelerating the vehicle using the motorcycle engine 22, as well as the flight engine 58 and its propeller 66.

Once airborne, the motorcycle engine 22 is shut down (if used for takeoff), and flight propulsion is provided entirely by the separate flight engine 58 and propeller 66. Vertical control is accomplished in the conventional manner for powered parachute type aircraft, by increasing power to the flight engine 58 to climb and decreasing power to descend, as such parafoil type aircraft fly with the parafoil at a constant, fixed angle of attack. Engine power is controlled by the left hand throttle twist grip 64, as described further above. Turns are accomplished in the conventional manner for such aircraft by increasing drag on one side or the other of the parafoil canopy, by pulling on the appropriate control line to the parafoil. This is accomplished in the present vehicle by means of the foot pedals and arms 36 and 38 extending below the forward portion of the peripheral frame structure 26, as described further above. Landing is accomplished as is conventional with powered parachute aircraft, by reducing power to provide a controlled descent and aligning the aircraft 10 with the desired landing site according to the wind direction and any other factors which may enter into consideration.

Once the aircraft 10 has landed, the two lateral wheels 78 provide lateral stability as the vehicle 10 rolls to a stop. The flight engine 58 is shut down, and the propeller 66 is turned to position its narrowest dimension laterally, with the sixty degree spacing between blades oriented at the top and bottom of the propeller assembly. The parafoil 34 is then gathered and folded, and placed atop the flight engine 58 for storage during ground operation of the vehicle 10. The folding portions 74 and 75 of the propeller guard may then be folded inwardly and locked into position for ground travel. Finally, the lateral wheels 78 are raised by means of the pneumatic system described further above, and manually retracted to narrow the overall width of the vehicle 10. The positioning of the propeller 66 as described above, along with the folding of the propeller guard lateral portions 74 and 75 and inward retraction of the lateral wheels 78, result in an overall width of four feet or less for the vehicle 10 in its ground configuration, enabling the vehicle 10 to be operated virtually anywhere a conventional motorcycle might be used and also allowing the vehicle 10 to be parked and stored compactly.

In conclusion, the present combination powered parachute and motorcycle vehicle provides a significant advance in versatility for lightweight, single place powered parachute type aircraft, and a further advance in ease of operation for vehicles which are convertible between flight and ground operation. While the present combination vehicle does not provide the speed, load, and weather capability of higher performance aircraft, it nevertheless fills a need in the light aircraft and light ground vehicle fields that heretofore had not been met by the various devices of the prior art.

The present combination vehicle also provides further versatility in that all of the flight components, including the peripheral frame, may be removed from the motorcycle to return the motorcycle to a pure ground vehicle configuration, if so desired. While such conversion is somewhat time consuming, with the flight componentry including the peripheral frame structure being considered an essentially permanent installation on the motorcycle, it is nevertheless possible to remove the flight components if such removal is desired. Alternatively, the structure may be configured to accept various quick release components in order to facilitate the installation and removal of the flight components from the motorcycle portion of the vehicle, if so desired. Thus, the flight componentry may be transferred to another similar motorcycle if desired, in the event the first motorcycle is damaged or for whatever reason such removal may be desired. Accordingly, the present combination powered parachute and motorcycle will find great favor among those who enjoy relatively low and slow flight and the sensations provided by open air motoring on a motorcycle, enabling them to enjoy both pursuits in a single versatile vehicle.

It is to be understood that the present invention is not limited to the sole embodiment described above, but encompasses any and all embodiments within the scope of the following claims.

I claim:

1. A combination powered parachute and motorcycle vehicle, comprising:
   a cycle vehicle having at least a frame, a directionally controllable forward wheel mounted on said frame and having directional control means for directionally controlling said forward wheel communicating therewith, a rear wheel mounted on said frame, a ground engine configured to drive said rear wheel, and a ground engine throttle configured to control said ground engine;
   a flight component attachment and safety structure attached to said frame of said cycle vehicle, essentially peripherally surrounding said cycle vehicle and extending thereabove;
   a flight propulsion mechanism secured to said flight component attachment and safety structure, and extending therefrom;
   a flexible, folding parafoil lifting device secured to said flight component attachment and safety structure, said parafoil lifting device being selectively deployed therefrom for flight;
   a parafoil secured to said parafoil lifting device;
   lateral flight control means for laterally adjusting said parafoil;
   vertical flight control means for controlling power produced by said flight propulsion mechanism; and
   a flight engine throttle configured to control said flight propulsion mechanism, said flight engine throttle being separate and independent of said lateral flight control means for laterally adjusting said parafoil.

2. The combination vehicle according to claim 1, wherein said flight propulsion mechanism comprises:
   a flight engine separate and independent from said ground engine;
   a propeller configured to be driven by said flight engine;
   a flight fuel system connected to said flight engine, said flight fuel system being separate and independent from said ground engine; and
   flight engine control means for controlling said flight engine, said flight engine control means being separate and independent from said ground engine.

3. The combination vehicle according to claim 1, further including laterally disposed, vertically and laterally adjustable left and right stabilizer wheels secured to and extending from said flight component attachment and safety structure.

4. The combination vehicle according to claim 3, further including remotely operated pneumatic means for selectively vertically adjusting said left and right stabilizer wheels.

5. The combination vehicle according to claim 3, further including manual means for selectively and manually adjusting lateral extension of said left and right stabilizer wheels.

6. The combination vehicle according to claim 1, further including means for adjusting said parafoil lifting device to said flight component attachment and safety structure forward and backward in order to adjust attitude of the cycle vehicle when airborne.

7. The combination vehicle according to claim 1, wherein said flight propulsion mechanism further includes a propeller guard disposed about said propeller and having folding left and right side portions.

8. The combination vehicle according to claim 1, wherein said parafoil is selected from the group consisting of a ram air inflated parafoil and an at least partially pneumatically inflated parafoil.

9. The combination vehicle according to claim 8, wherein said parafoil is an at least partially pneumatically inflated parafoil, and said combination vehicle further comprises remotely operated pneumatic means for selectively inflating said at least partially pneumatically inflated parafoil.

10. A combination powered parachute and motorcycle vehicle, comprising:
   a cycle vehicle having at least a frame, a directionally controllable forward wheel mounted on said frame and having directional control means for directionally controlling said forward wheel communicating therewith, a rear wheel mounted on said frame, a ground engine configured to drive said rear wheel, and a ground engine throttle configured to control said ground engine;
   flight propulsion means for propelling said cycle vehicle, said flight propulsion means being secured to said cycle vehicle, and extending therefrom;
   flight propulsion control means for controlling said flight propulsion means, said flight propulsion control means being separate and independent from said ground engine throttle;
   a flexible, folding parafoil lifting device secured to said cycle vehicle, selectively deployed therefrom for flight;
   a parafoil secured to said parafoil lifting device;

lateral flight control means for laterally adjusting said parafoil; and a flight engine throttle configured to control said flight propulsion means, said flight engine throttle being separate and independent of said lateral flight control means for laterally adjusting said parafoil, and said directional control means of said cycle vehicle being separate and independent of said lateral flight control means for laterally adjusting said parafoil.

11. The combination vehicle according to claim 10, wherein said flight propulsion means comprises:
   a flight engine separate and independent from said ground engine;
   a propeller configured to be driven by said flight engine;
   a flight fuel system, separate and independent from said ground engine; and
   flight engine control means for controlling said flight engine, said flight engine control means being separate and independent from said ground engine.

12. The combination vehicle according to claim 10, further including:
   a flight component attachment and safety structure attached to said frame of said cycle vehicle, essentially peripherally surrounding said cycle vehicle and extending thereabove;
   said flight propulsion means being secured to said flight component attachment and safety structure; and
   said parafoil lifting device being secured to said flight component and safety structure.

13. The combination vehicle according to claim 12, further including selectively longitudinally adjustable left and right parafoil attachment points disposed upon said flight component attachment and safety structure.

14. The combination vehicle according to claim 12, further including laterally disposed, vertically and laterally adjustable left and right stabilizer wheels secured to and extending from said flight component attachment and safety structure.

15. The combination vehicle according to claim 14, further including remotely operated pneumatic means for selectively vertically adjusting said left and right stabilizer wheels.

16. The combination vehicle according to claim 14, further including manual means for selectively telescopingly laterally adjusting said left and right stabilizer wheels.

17. The combination vehicle according to claim 10, wherein said flight propulsion means further includes a propeller guard having folding left and right side portions.

18. The combination vehicle according to claim 10, wherein said parafoil is selected from the group consisting of a ram air inflated parafoil and an at least partially pneumatically inflated parafoil.

19. The combination vehicle according to claim 18, wherein said parafoil is an at least partially pneumatically inflated parafoil, and said combination vehicle further comprises remotely operated pneumatic means for selectively inflating said at least partially pneumatically inflated parafoil.

20. A combination powered parachute and motorcycle vehicle, comprising:
   a cycle vehicle having at least a frame, a directionally controllable forward wheel mounted on said frame and having directional control means for directionally controlling said forward wheel communicating therewith, a rear wheel mounted on said frame, a ground engine configured to drive said rear wheel, and a ground engine throttle configured to control said ground engine;
   laterally disposed, vertically and laterally adjustable left and right stabilizer wheels secured to and extending from said cycle vehicle;
   flight propulsion means for propelling said cycle vehicle, said flight propulsion means being secured to said cycle vehicle, and extending therefrom;
   a flexible, folding parafoil lifting device secured to said cycle vehicle, said parafoil lifting device being selectively deployed therefrom for flight;
   a parafoil secured to said parafoil lifting device;
   lateral flight control means for laterally adjusting said parafoil; and
   vertical flight control means for controlling power produced by said flight propulsion mean; and
   a flight engine throttle configured to control said flight propulsion means, said flight engine throttle being separate and independent of said lateral flight control means for laterally adjusting said parafoil, and said directional control means of said cycle vehicle being separate and independent of said lateral flight control means for laterally adjusting said parafoil.

21. The combination vehicle according to claim 20, further including remotely operated pneumatic means for selectively vertically adjusting said left and right stabilizer wheels.

22. The combination vehicle according to claim 20, further including manual means for selectively telescopingly laterally adjusting said left and right stabilizer wheels.

23. The combination vehicle according to claim 20, wherein said flight propulsion means comprises:
   a flight engine separate and independent from said ground engine;
   a propeller configured to be driven by said flight engine;
   a flight fuel system separate and independent from said ground engine; and
   flight engine control means for controlling said flight engine, said flight engine control means being separate and independent from said ground engine.

24. The combination vehicle according to claim 20, further including:
   a flight component attachment and safety structure attached to said frame of said cycle vehicle, essentially peripherally surrounding said cycle vehicle and extending thereabove;
   said flight propulsion means being secured to said flight component attachment and safety structure; and
   said parafoil lifting device being secured to said flight component attachment and safety structure.

25. The combination vehicle according to claim 24, further including selectively longitudinally adjustable left and right parafoil attachment points disposed upon said flight component attachment and safety structure.

26. The combination vehicle according to claim 20, wherein said flight propulsion means further includes a propeller guard having folding left and right side portions.

27. The combination vehicle according to claim 20, wherein said parafoil is selected from the group consisting of a ram air inflated parafoil and an at least partially pneumatically inflated parafoil.

28. The combination vehicle according to claim 27, wherein said parafoil is an at least partially pneumatically inflated parafoil, and said combination vehicle further comprises remotely operated pneumatic means for selectively inflating said at least partially pneumatically inflated parafoil.

29. A combination powered parachute and motorcycle vehicle, comprising:
- a cycle vehicle having at least a frame, a directionally controllable forward wheel mounted on said frame and having directional control means for directionally controlling said forward wheel communicating therewith, a rear wheel mounted on said frame, a ground engine configured to drive said rear wheel, and a ground engine throttle configured to control said ground engine;
- a flexible, folding parafoil lifting device secured to said cycle vehicle, selectively deployed therefrom for flight;
- a parafoil secured to said parafoil lifting device;
- an adjustable parafoil attachment structure for selectively attaching said parafoil to said cycle vehicle longitudinally;
- left and right parafoil attachment extension arms foldably extending from said adjustable parafoil attachment structure;
- flight propulsion means for propelling said cycle vehicle, said flight propulsion means being secured to said flight component attachment and safety structure, and extending therefrom;
- lateral flight control means for laterally adjusting said parafoil;
- vertical flight control means for controlling power produced by said flight propulsion means; and
- a flight engine throttle configured to control said flight propulsion mean, said flight engine throttle being separate and independent of said lateral flight control means for laterally adjusting said parafoil, and said directional control means of said cycle vehicle being separate and independent of said lateral flight control means for laterally adjusting said parafoil.

30. The combination vehicle according to claim 29, wherein said flight propulsion means comprises at least:
- a flight engine separate and independent from said ground engine;
- a propeller driven by said flight engine;
- a flight fuel system separate and independent from said ground engine; and
- flight engine control means for controlling said flight engine, said flight engine control means being separate and independent from said ground engine.

31. The combination vehicle according to claim 29, further including:
- a flight component attachment and safety structure attached to said frame of said cycle vehicle, essentially peripherally surrounding said cycle vehicle and extending thereabove;
- said flight propulsion means being secured to said flight component attachment and safety structure;
- said parafoil lifting device being secured to said flight component and safety structure; and
- said adjustable parafoil attachment structure comprises selectively longitudinally adjustable left and right parafoil attachment points disposed upon said flight component attachment and safety structure.

32. The combination vehicle according to claim 31, further including laterally disposed, vertically and laterally adjustable left and right stabilizer wheels secured to and extending from said flight component attachment and safety structure.

33. The combination vehicle according to claim 32, further including remotely operated pneumatic means for selectively vertically adjusting said left and right stabilizer wheels.

34. The combination vehicle according to claim 32, further including manual means for selectively telescopingly laterally adjusting said left and right stabilizer wheels.

35. The combination vehicle according to claim 29, wherein said flight propulsion means further includes a propeller guard having folding left and right side portions.

36. The combination vehicle according to claim 29, wherein said parafoil is selected from the group consisting of a ram air inflated parafoil and an at least partially pneumatically inflated parafoil.

37. The combination vehicle according to claim 36, wherein said parafoil is an at least partially pneumatically inflated parafoil, and said combination vehicle further comprises remotely operated pneumatic means for selectively inflating said at least partially pneumatically inflated parafoil.

38. A combination powered parachute and motorcycle vehicle, comprising:
- a cycle vehicle having at least a frame, a directionally controllable forward wheel mounted on said frame and having directional control means for directionally controlling said forward wheel communicating therewith, a rear wheel mounted on said frame, a ground engine configured to drive said rear wheel, and a ground engine throttle configured to control said ground engine;
- a flexible, folding parafoil lifting device secured to said cycle vehicle, selectively deployed therefrom for flight;
- a parafoil secured to said parafoil lifting device;
- a propeller guard having folding left and right side portions;
- flight propulsion means for propelling said cycle vehicle, and being secured to said cycle vehicle, and extending therefrom;
- lateral flight control means for laterally adjusting said parafoil; and
- vertical flight control means for controlling power produced by said flight propulsion means; and
- a flight engine throttle configured to control said flight propulsion means, said flight engine throttle being separate and independent of said lateral flight control means for laterally adjusting said parafoil, and said directional control means of said cycle vehicle being separate and independent of said lateral flight control means for laterally adjusting said parafoil.

39. The combination vehicle according to claim 38, wherein said flight propulsion means comprises at least:
- a flight engine separate and independent from said ground engine;
- a propeller configured to be driven by said flight engine;
- a flight fuel system separate and independent from said ground engine; and
- flight engine control means for controlling said flight engine, said flight engine control means being separate and independent from said ground engine.

40. The combination vehicle according to claim 38, further including:
- a flight component attachment and safety structure attached to said frame of said cycle vehicle, essentially peripherally surrounding said cycle vehicle and extending thereabove;

said flight propulsion means being secured to said flight component attachment and safety structure;

said parafoil lifting device being secured to said flight component and safety structure; and an adjustable means for selectively attaching said parafoil to said cycle vehicle longitudinally, said adjustable means comprising selectively longitudinally adjustable left and right parafoil attachment points disposed upon said flight component attachment and safety structure.

41. The combination vehicle according to claim 40, further including laterally disposed, vertically and laterally adjustable left and right stabilizer wheels secured to and extending from said flight component attachment and safety structure.

42. The combination vehicle according to claim 41, further including remotely operated pneumatic means for selectively vertically adjusting said left and right stabilizer wheels.

43. The combination vehicle according to claim 41, further including manual means for selectively telescopingly laterally adjusting said left and right stabilizer wheels.

44. The combination vehicle according to claim 41, further including adjustable means for selectively attaching said parafoil to said cycle vehicle longitudinally.

45. The combination vehicle according to claim 38, wherein said parafoil is selected from the group consisting of a ram air inflated parafoil and an at least partially pneumatically inflated parafoil.

46. The combination vehicle according to claim 45, wherein said parafoil is an at least partially pneumatically inflated parafoil, and said combination vehicle further comprises remotely operated pneumatic means for selectively inflating said at least partially pneumatically inflated parafoil.

* * * * *